United States Patent
Fields

[11] 3,713,236
[45] Jan. 30, 1973

[54] MOTOR DRIVEN MAP VIEWER AND TRACKING DEVICE
[76] Inventor: Harold E. Fields, 1563-A West Lincoln Avenue, Milwaukee, Wis. 53215
[22] Filed: April 5, 1971
[21] Appl. No.: 131,283

[52] U.S. Cl. ............... 40/33, 33/204 J, 40/106.45, 116/29
[51] Int. Cl. ............................................. G09f 11/10
[58] Field of Search ....... 116/28, 29; 33/204 J, 141.5; 40/33, 44, 106.45

[56] References Cited
UNITED STATES PATENTS

| | | | |
|---|---|---|---|
| 3,243,897 | 4/1966 | West | 33/141.5 X |
| 1,331,820 | 2/1920 | Myers | 40/44 |
| 2,354,917 | 8/1944 | Jones | 33/204 J |
| 3,570,445 | 3/1971 | Johnson | 40/106.45 |
| 1,453,755 | 5/1923 | Craver | 40/106.45 |

Primary Examiner—Robert W. Michell
Assistant Examiner—John F. Pitrelli
Attorney—Wheeler, House & Wheeler

[57] ABSTRACT

A device to aid motorists in determining their position on a highway map includes a freely supported globe having a map of the area being traveled. The globe is moved by a motor driven magnetic drive wheel which tracks a route path or film traced on the selected route with a marker containing a supply of para-magnetic particles in a fast drying liquid or a paste carrier which is applied to the selected route with a marker prior to initiation of the trip. A motor speed control knob with a pointer and associated scale with vehicle speed indicia is pre-set or periodically adjusted to move the globe at a speed related to the scale of the map and corresponding to the vehicle speed to maintain the vehicle position on the route path in registry with a position indicating pointer on a magnifying viewing window.

10 Claims, 6 Drawing Figures

PATENTED JAN 30 1973
3,713,236
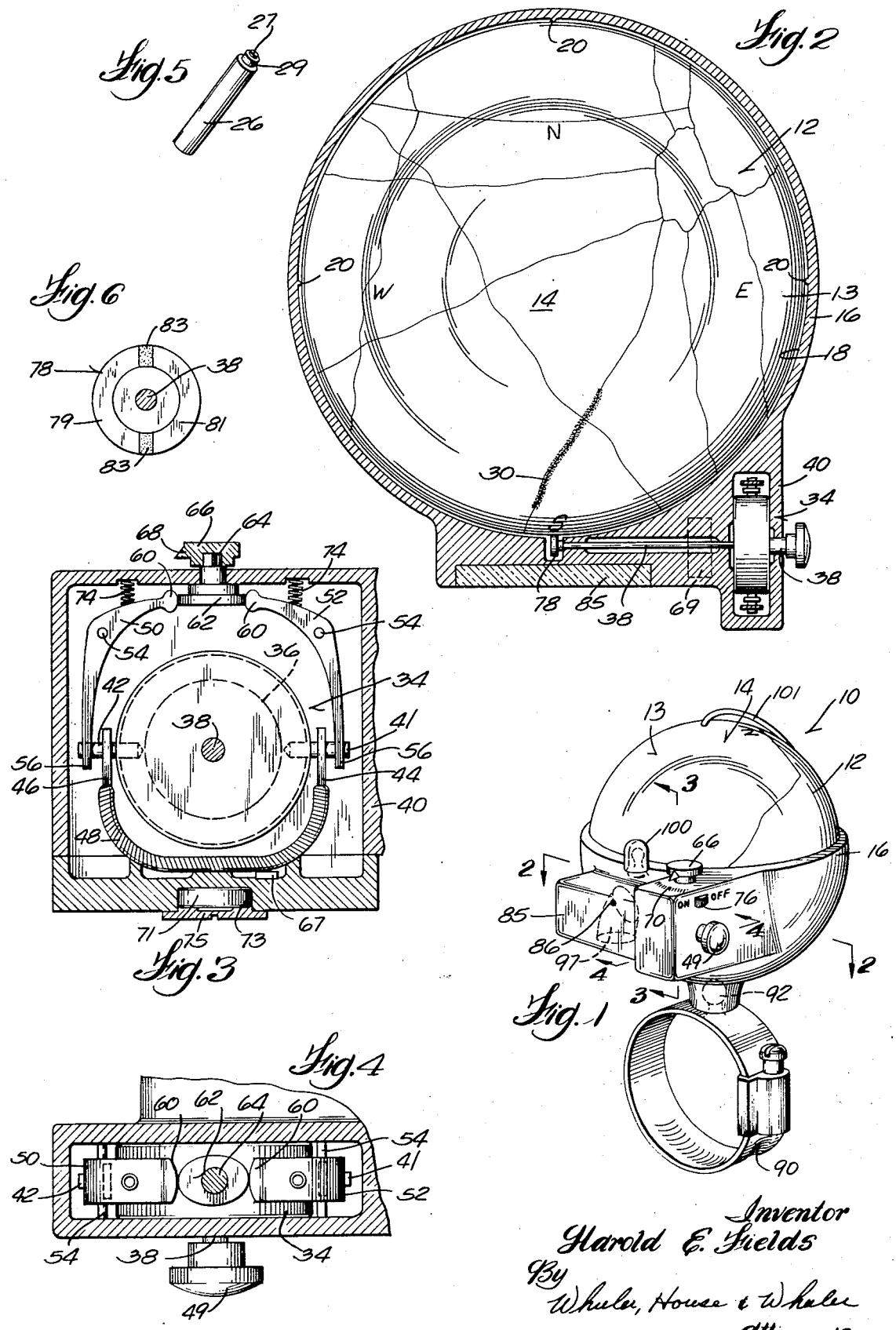

MOTOR DRIVEN MAP VIEWER AND TRACKING DEVICE

SUMMARY OF INVENTION

The invention provides a device for aiding motorists in determining their highway position on a map. The map is printed on a globe which is freely rotatably supported for universal movement in an upwardly open half shell or hemisphere which receives the globe.

In one embodiment of the invention, the selected route path is traced on the highways with a marker containing fine particles of a para-magnetic substance such as finely powdered iron in an adhesive paste or putty-like carrier. The particles may also be suspended in a fast drying fluid. The drive wheel for moving the sphere comprises a spherical or disc shaped magnet which tracks the powdered iron route path and moves the sphere to maintain the position of the vehicle on the globe in registry with a magnifying viewer which can be provided with a dot or needle position indicator.

The starting point on the route is centered in the viewing window prior to commencement of the trip. The drive wheel is driven by a motor having a variable speed control device operated by an easily accessible speed adjustment knob having a pointer associated with a miles per hour scale so that the rate of rotation of the motor can be adjusted to correspond to the vehicle's speed and thus the route path on the globe will be tracked by the drive wheel at a speed equivalent to the vehicle's speed to maintain the vehicle position on the globe in registry with the viewing window.

Any sub-miniature reversible ac or dc motor can be employed. The motor can be operated from a self-contained battery or the vehicle electric circuit. The use of various speed control devices including variable resistors, solid state devices, and variable speed mechanical drives can be employed to obtain the appropriate rate of movement of the globe.

Further objects, features, and advantages of the invention will become apparent from the following disclosure.

DRAWINGS

FIG. 1 is a perspective view of the map tracking device of the invention.

FIG. 2 is an enlarged sectional view along line 2—2 of FIG. 1.

FIG. 3 is a fragmentary sectional view along line 3—3 of FIG. 1.

FIG. 4 is a sectional view along line 4—4 of FIG. 1.

FIG. 5 is a side view of a marker employed to provide the route path on the globe.

FIG. 6 is an enlarged side view of the drive wheel shown in FIG. 2.

FIG. 1 discloses a tracking device in accordance with the invention which is generally designated 10 and which includes a sphere or globe 12 containing a map 14. The map 14 desirably contains the highways for a single state or locality and can be printed and arranged on the surface 13 of the globe to cover only a portion of the globe surface so that the motorist can easily orient himself.

Means are provided for freely rotatably supporting the globe 12 for universal movement. As disclosed, the means includes an upwardly open hemispherical shell 16 which has an inside diameter greater than the outside diameter of the globe 12. A clearance between the globe surface 13 and the inside surface 18 of the shell 16 of 0.005 inches is desirable. Bearings 20 arranged around the inside of the shell 16 support the globe for free movement of the globe in all directions.

Means are provided for applying a magnetically trackable route path on the selected route on the map 14. In the disclosed embodiment, the means comprises a marking device 26 which contains a supply of fine para-magnetic particles 27 in an adhesive binder or carrier 29 which provides a narrow path 30 on the map 14. The path 30 is tracked by a magnetic drive wheel presently described. The para-magnetic particles can also be suspended in a fast drying fluid. Alternatively, the particles 27 can be magnetized and a para-magnetic drive wheel employed.

Means are provided for moving the sphere 12 at variable rates of movement corresponding to the speed of the vehicle in which the device 10 is employed. As disclosed, the means comprises an electric motor 34 which has a rotor or armature 36 with an armature shaft or output shaft 38 rotatably supported in a housing 40 which can be integral with the shell 16. Either a permanent magnet with 120 to 240 poles or a wire wound armature and a commutator can be used. If a permanent magnet rotor is used, the field coil can be provided with a pulsating current by using a switch operated by a cam (not shown) on the armature shaft. In the event the motor employed is not self-starting, a starting knob 49 can be connected to the armature shaft. The means includes adjustable pole pieces 41 and 42 which are movable through apertures in the legs 44 and 46 of the field coil 48 and in a radial direction with respect to the axis of the armature 36 and output shaft 38. The field coil 48 has a hollow soft iron core. Movement of the pole pieces 41, 42 is provided by bell cranks 50 and 52 which are pivotally supported on the housing 40 by pins 54. The bell cranks 50 and 52 have ends 56 connected to the pole pieces 41 and 42. The other ends of the bell cranks 50, 52 have cam follower surfaces 60 engaged by a double cam or eccentric 62 which is connected to a shaft 64 provided with a knob 66 and pointer 68. Springs 74 bias the cam follower surfaces 60 against the eccentric 62.

As shown in FIG. 1, the housing 40 is provided with a scale 70 having miles per hour indicia in a range of for instance, 10 to 80 mph to afford adjustment of the rate of motor rotation and thus the rate of movement of the sphere to a speed equivalent to the speed of the vehicle.

Any of various reversible sub-miniature motors can be employed with any type of compact control device for varying the rate of rotation of the motor output shaft. Variable resistors and solid state motor controls as well as variable speed mechanical drives can be employed.

When using a dc motor, the motor can be operated by a small battery 71 (FIG. 31) secured in a recess 73 in the housing 40 by a screw 75. An on-off switch 76 can be connected to the motor and the battery 71 by a circuit (not shown). A resistor 67 can be included in series with the field winding to prevent arcing at the pole pieces 41, 42. The motor also can be operated from the vehicle electrical system with a suitable voltage changing device to obtain the required motor voltage.

A gear reduction unit 69 (shown in broken lines in FIG. 2) can be connected in series with the armature 36 and the shaft 38 to obtain the appropriate rate of movement of the globe.

With the use of a globe 2 to 4 inches in diameter the rate of rotation of the output shaft should be adjustable in a range between 1 and 5 revolutions per hour.

Means are provided for drivingly connecting the motor output shaft to the globe 12 to afford movement of the globe and to track the para-magnetic route 30 on the globe. As disclosed, the means can be in the form of a magnetized wheel or disc 78.

The drive wheel can be molded from ferrite and magnetized with two magnetic circular ring sectors 79, 81 separated by dead zones 83. Alternatively, the drive wheel can be in the form of a sphere with magnetized zones.

The magnetic disc 78 tracks the magnetic path 30 and moves the globe 12 in the necessary direction to maintain the vehicle position on the map in registry with a magnifying viewing window 85 having a position indicating dot or pointer 86 which can be luminous.

Various mounting arrangements can be employed for supporting the device 10 in a vehicle. In FIG. 1, an adjustable clamp 90 connected to the housing 40 by a ball and socket connection 92 enables the device 10 to be mounted on the vehicle steering column. Alternatively, the device can be mounted on the instrument panel or dash with a magnetic or pressure sensitive adhesive mount (not shown) which can be connected to the device with telescopically related adjustable tubes.

The housing 40 can be provided with a slot 97, FIG. 1 to enable marking of the globe 12 under the magnifying window 85 so that the motorist can easily read the map. Luminous or fluorescent printing can also be used on the map.

A light bulb and shield 100 can be employed to illuminate the globe. If a translucent globe is used, a window in the bottom of the shell 16 and a lightbulb mounted outside the shell will illuminate the entire globe. An arm 101 pivoted to the housing 40 can retain the globe 12 in the shell 16.

The ferromagnetic particles used in the marker can be of the type employed in the practice of magnetic particle inspection or flaws in metal and be either fluorescent or non-fluorescent or luminous.

In use, the globe 12 containing the map 14 for the state being traveled is inserted in the shell 16, and the arm 101 is positioned over the globe 12 to retain the globe in the shell 16. The marking device is inserted in the slot 97 and the globe 12 is manually manipulated as the route path is traced on the highway to be traveled as the motorist views the map through the magnifying lens in the window 85. After the route is traced, the starting point on the map is centered in the viewing window in registry with the position indicating dot 86. The knob 66 is adjusted to the appropriate speed. The motor 34 is then energized in the appropriate direction.

If the motor 34 is not self-starting and is provided with a starting knob 49, the knob is manually spun either clockwise or counter-clockwise to initiate rotation of the armature. As the vehicle speed changes during travel, the motor speed knob 66 is adjusted.

Various of the features of the invention are set forth in the following claims.

What is claimed is:

1. A device for determining the position of a vehicle on a map comprising a sphere having a map on its surface, means supporting said sphere for universal movement, a magnetically trackable route path on said map, fixed means indicating a vehicle position on said map, and means to rotate said sphere at a rate proportionate to the rate of movement of said vehicle at the scale size of said map, said means to rotate said sphere including a drive wheel, and means effective to establish magnetic attraction between the drive wheel and the path, whereby the direction of rotation of said sphere is determined by said route path.

2. A device in accordance with claim 1 wherein said means for freely supporting said sphere for universal movement comprises a hemispherical half shell having an inside diameter greater than the diameter of the sphere and bearings spaced on the periphery of the inside surface of the shell for engaging and supporting said sphere.

3. A device for determining the position of a vehicle on a map comprising a sphere having a map on its surface, means supporting said sphere for universal movement, a magnetically trackable route path on said map, fixed means indicating a vehicle position on said map, and means to rotate said sphere at a rate proportionate to the rate of movement of said vehicle at the scale size of said map to maintain the vehicle position on the selected route path in registry with said position indicating means, said means to rotate said sphere including a drive rotor engaged with said sphere, one of said magnetically trackable route path and said drive rotor being a magnet and the other of said drive rotor and said trackable route path being magnetically attractable.

4. A device in accordance with claim 3 including means for varying the rate of rotation of said means to rotate said sphere to adjust said rate in accordance with vehicle speed.

5. A device in accordance with claim 4 wherein said means for varying the rate of rotation comprises a motor having a rotatable part connected to said rotor and a field coil, adjustable pole pieces on said field coil, a bell crank having one end connected to a said pole piece and another end having a cam follower surface, an eccentric engageable with said cam follower surface, means to turn said eccentric, said last mentioned means being calibrated with miles per hour indicia so that said means can be adjusted in accordance with the vehicle speed to move the pole pieces and change the rate of rotation of said motor.

6. A device in accordance with claim 1 wherein said magnetically trackable route path comprises iron particles in a paste carrier.

7. A device in accordance with claim 6 wherein said iron particles are magnetized.

8. A device in accordance with claim 1 including a viewing window having a magnifying lens and including said vehicle position indicator on said window.

9. A device in accordance with claim 8 wherein said means for supporting said sphere includes an aperture to admit a marker between said sphere and said magnifying lens.

10. A device in accordance with claim 1 wherein said drive wheel is a permanent magnet.

* * * * *